Jan. 4, 1972    T. H. FAIRBANKS    3,632,716
MANUFACTURE OF WEBS HAVING SELECTED ORIENTED PORTIONS
Filed Dec. 17, 1968    2 Sheets-Sheet 2

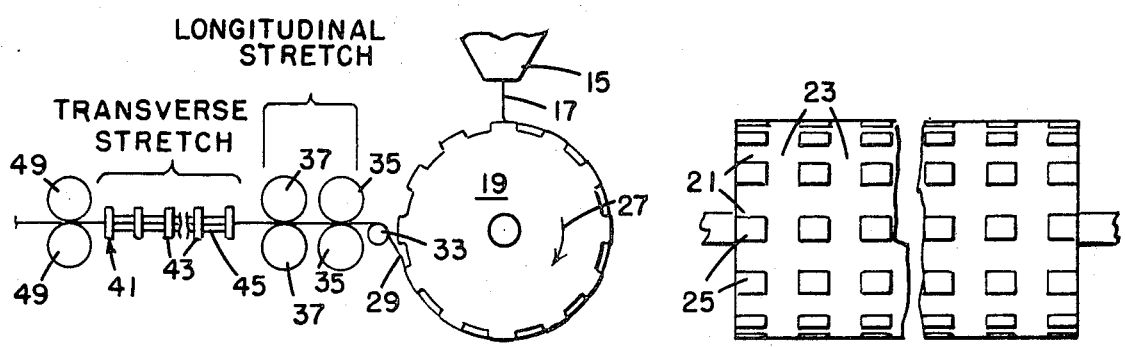
Fig. 1
Fig. 2
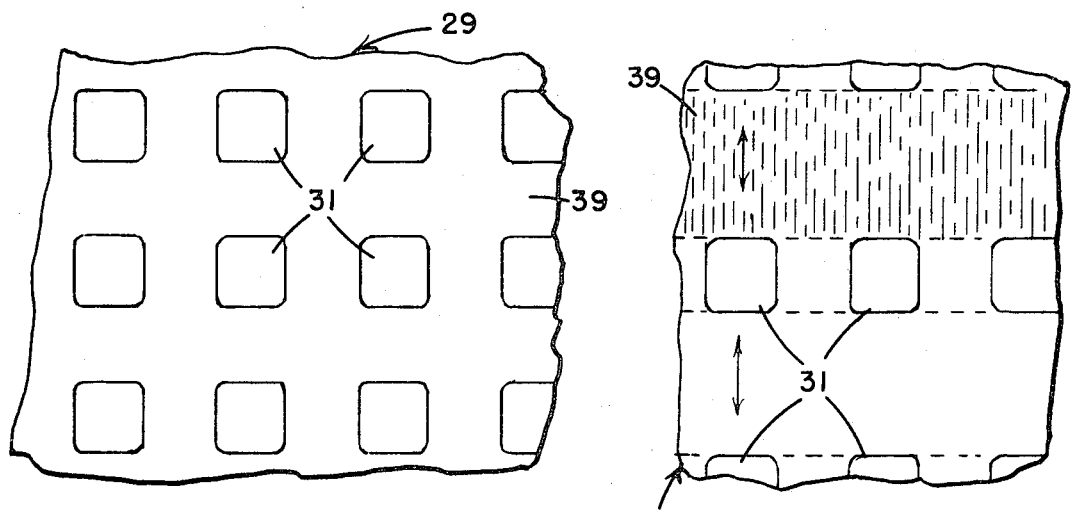
Fig. 3
Fig. 4
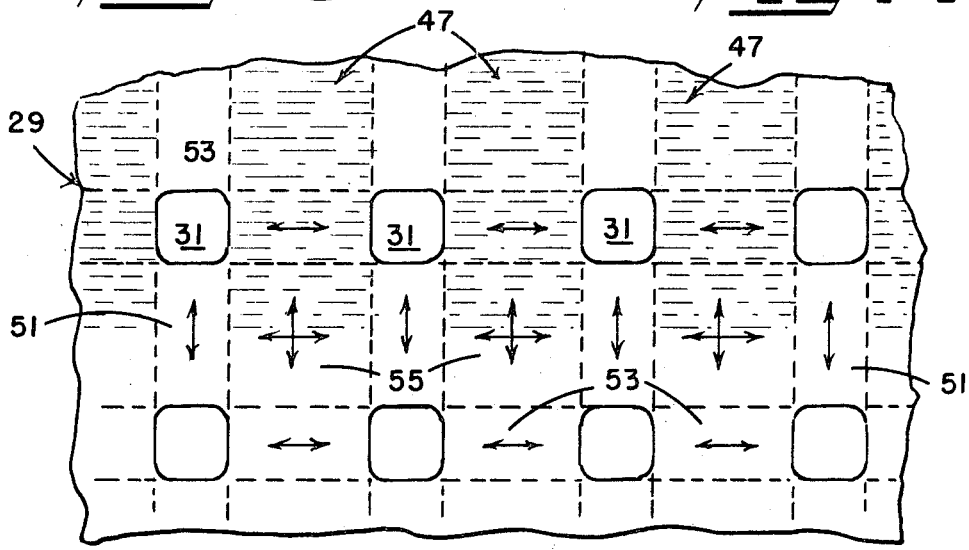
Fig. 5

# United States Patent Office 3,632,716
Patented Jan. 4, 1972

3,632,716
MANUFACTURE OF WEBS HAVING SELECTED ORIENTED PORTIONS
Theodore H. Fairbanks, West Chester, Pa., assignor to FMC Corporation, Philadelphia, Pa.
Filed Dec. 17, 1968, Ser. No. 784,383
Int. Cl. B29c 25/00; B29d 7/22, 7/24
U.S. Cl. 264—145                               3 Claims

ABSTRACT OF THE DISCLOSURE

Manufacture of a thermoplastic polymeric web or film having a predetermined pattern of molecularly oriented portions wherein an extruded flat unbroken web or film is partially cooled to provide selected areas cooled at more rapid rate than the regions adjacent thereto, and immediately after such cooling stretching the web or film along biaxial directions while the selected areas and the regions adjacent thereto are still held at such different temperatures.

---

The present invention is directed to an improved method for making films or webs from thermoplastic polymeric materials which possess high strength, stiffness and tear resistant properties.

U.S. Pat. 3,255,065, issued on June 7, 1966, to H. W. Wyckoff, discloses a method and apparatus for making a composite film by laminating, or otherwise uniting, an unbroken and unoriented web of thermoplastic polymeric material with a similar web having a series of openings or perforations disposed in a predetermined pattern, followed by a stretching of the laminated structure along desired directions.

Upon stretching of such laminated structure along its longitudinal and transverse axes, the portions of the unbroken web which extend across the openings in the perforated web are biaxially oriented. The ribs of the perforated web, and the portions of the unbroken web attached thereto, are uniaxially oriented and impart desired stiffness into the resulting composite film, while the areas of the laminted structure which are located between the ends of such ribs remain undrawn.

As more fully described in the above-noted patent, the relationship between the spacing and size and/or shape of the openings in the perforated web is of critical importance from the standpoint of isolating the effects of the stretching forces to the ribs themselves so that undrawn junctions remain between the uniaxially drawn ribs.

The manufacture of composite films by the method described in the above-noted patent requires the production of separate unoriented webs of thermoplastic polymeric material, the perforating of one of such webs, the laminating of the unperforated and perforated webs, and finally the biaxial stretching of the laminated structure. These numerous manipulative steps, taken with the critical care which must be exercised to insure proper web perforation and lamination render the above-described patented method slow and costly. Accordingly, a primary object of this invention is to provide a new or generally improved and more satisfactory method for making a thermoplastic polymeric web or film having good strength and stiffness along its selected directions and which exhibits improved tear resistant characteristics.

Another object is the provision of a method for providing a web of thermoplastic polymeric material of generally uniform thickness with a predetermined pattern of molecularly oriented portions.

Still another object of this invention is a method which is adapted for rapid and economical manufacture of thermoplastic polymeric rolls or films having a predetermined pattern of molecularly oriented portions.

A further object is the provision of a method for making a thermoplastic polymeric film having fabric-like properties along selected portions thereof.

For a greater understanding of this invention, reference is made to the following detailed description and drawing in which FIG. 1 is a diagrammatic view of the apparatus employed in the method of the present invention;

FIG. 2 is a front view of a chill roller employed in the apparatus shown in FIG. 1;

FIG. 3 is a plan view of a portion of a thermoplastic polymeric web produced on the chill roller shown in FIG. 1;

FIG. 4 is a plan view illustrating the web of FIG. 3 after it has been stretched along one of its axial directions;

FIG. 5 is a plan view illustrating the web shown in FIG. 4 after it has been stretched along another of its biaxial directions;

Figure 6:
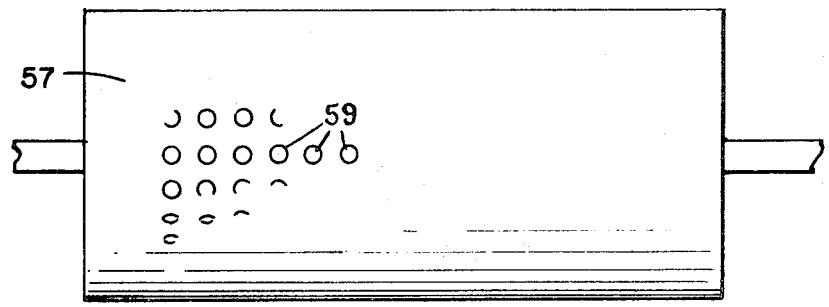
FIG. 6 is a front view of a modified chill roller for use in the apparatus of FIG. 1.
Figure 7:
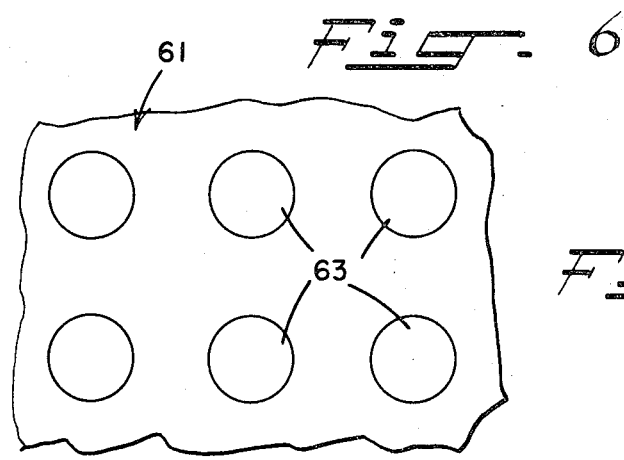
FIG. 7 is a plan view of a portion of the web produced on the chill roll shown in FIG. 6.

The above and other objects of the invention are achieved by a method in which an extruded flat and unbroken stream of molten thermolastic orientable polymeric material is at least partially cooled to provide an integral web, with selected independent and substantially like areas, aligned longitudinally and transversely of the extruded stream and equally spaced in their respective directions, being cooled at a different rate than the regions which are adjacent thereto. This at least partially cooled web is then stretched along biaxial directions whereby the regions between adjacent transversely aligned selected areas are uniaxially oriented in a direction transversely of the web, while the regions between adjacent longitudinally aligned selected areas are also uniaxially oriented but in a direction longitudinally of the web. The selected areas of the web remain substantially undrawn while the remaining regions of the web are biaxially oriented.

In one mode of practicing the method of the present invention, a stream of molten thermoplastic polymeric material is only partially cooled following extrusion, with the selected areas thereof being cooled at a more rapid rate than the regions which are adjacent thereto. This partially cooled web is then stretched along biaxial directions while it is still in a heated condition.

In another mode of practicing the method of the present invention, which is particularly adapted for use with thermoplastic polymeric materials having a tendency to crystallize, the stream of molten thermoplastic material is completely cooled after its extrusion and before stretching, with the selected areas thereof being cooled at a slower rate than the regions which are adjacent thereto. Crystallization accompanies this slower cooling in the selected areas of the web and thus such selected areas undergo no apparent or significant drawing during the subsequent stretching stage.

In the practice of the method of the present invention, the web may be stretched along biaxial directions in independent steps or simultaneously. The degree to which the web is stretched in either of its biaxial directions may be varied and is preferably such as to orient all regions between the transversely and longitudinally aligned selected areas of the web. Fabric-like characteristics may be imparted to the resulting product by exerting such stretching as to cause fibrillation of the biaxially oriented regions thereof. Heat may be applied to the web which is being stretched prior to and/or during the actual stretching step to encourage the drawing thereof.

In general, the apparatus employed in the method of the present invention includes means for extruding a continuous, flat and unbroken stream of molten thermoplastic polymeric material, a patterned chill member position to receive upon its surface the flat stream of molten thermoplastic material as it issues from the extruding means for at least partially cooling the same into an integral web, means for moving the chill member relative to the extruding means, and means for stretching the web along biaxial directions. The patterned chill member is formed with substantially like selected areas, aligned with each other longitudinally and transversely thereof and equally spaced in their respective directions, and are at different elevations than the regions or areas which are adjacent thereto.

The chill member is preferably a roller having a patterned peripheral surface and, depending upon the mode of carrying out the method of the present invention the selected surface areas thereof may project above the regions which are adjacent thereto or may be defined by depressions in the roller periphery. The projecting selected surface areas may be of generally rectangular configuration and may be formed by providing the roller peripheries with spaced longitudinal and circumferential extending grooves which intersect with each other. In the alternative chill roller construction, the depressions are preferably of circular and concave configuration.

The method of the present invention is adapted for use in making films from all thermoplastic materials, the molecules of which may be oriented by stretching. The particular polymeric material employed will depend upon the mode of practicing the method of the present invention as well as the intended use of the resulting product. The products made in accordance with the teachings of the present invention are suited for a variety of uses in which either the non-porous or the fabric-like properties of the product are of particular importance and where high strength, stiffness and tear resistance are desired characteristics. For example, webs made by the present invention may be used as protective coverings or shields as in building construction, as article wrapping or bagging materials, as inflatable structures, such as observation balloons, life rafts, etc.

For a more detailed description of the method of the present invention, reference is made to FIG. 1 of the drawing wherein character 15 denotes a portion of a die or nozzle, which is part of a conventional extrusion system, from which a flat unbroken stream 17 of molten thermoplastic polymeric material, such as polypropylene is extruded. This extruded stream 17 of molten thermoplastic polymeric material is received upon a chill roller 19 which, as shown in FIG. 2, is provided with a series of longitudinal and circumferential grooves 21 and 23, respectively, which intersect with each other leaving selected projecting surface areas 25. The grooves 21 and 23 are equally spaced in their respective directions and thus the selected surface areas 25 are of substantially like size and are aligned both circumferentially and longitudinally of the roller 19. Suitable means, not shown, is provided for continuously driving the roller 19 in the direction as indicated by arrow 27. The roller 19 is cooled by circulating a chilled liquid therethrough or by any other known and conventional manner.

The stream 17 of molten thermoplastic material extruded onto and traveling with the chill roller 19 is cooled to provide an integral web 29, which is still in a heated condition when removed from the surface of the roller 19, yet is capable of being handled during subsequent stages of the method without experiencing any undesired distortion. When received upon and during advancement of chilled roller 19, the stream 17 of molten thermoplastic material contacts snugly with the selected roller surface areas 25, while spanning the roller grooves 21 and 23. Thus, the portions of such stream 17 which are engaged with the selected surface areas 25 of the roller 19 are cooled more rapidly than the portions which are adjacent thereto. FIG. 3 illustrates a portion of the web 29, with the more rapidly cooled areas thereof being indicated at 31.

The web 29 is removed from the surface of the chill roller 19 by a stripping roll 33 and is passed in-between pairs of conventional driven nip rolls 35 and 37. The nip rolls 37 are driven at a more rapid rate than the nip rolls 35 whereby sections 39, which extend transversely of the web at longitudinally spaced intervals thereof, are stretched longitudinally to orient the molecules thereof, as indicated by shading in FIG. 4. Since the selected web areas 31 have been cooled to a lower temperature than the surrounding regions of the web prior to stretching, these areas do not yield under the stretching forces and thus prevent longitudinal stretching of the regions between the adjacent transversely aligned areas 31.

Once beyond the nip rolls 37, the web 29 is passed into a conventional tenter frame 41 where its longitudinal edges are gripped at spaced intervals by clips 43 carried by endless belts 45. From the nip rolls 37, the belts 45 of the tenter frame 41 are directed along diverging paths. Thus, during movement with the tenter frame belts 45 sections 47 of the web 29, which extend longitudinally of the web at transversely spaced intervals thereof, are stretched to orient the molecules thereof as indicated by shading in FIG. 5. As during the longitudinal stretching of the web 29, the cooler selected areas 31 do not yield during this stretching stage and thus prevent transverse drawing of the regions of the web located between the adjacent longitudinally aligned areas 31.

The now biaxially stretched web 29 is released from the tenter frame, cooled if necessary, and advanced by nip rolls 49 to a suitable collection means, not shown.

In the resulting web product, as shown in FIG. 5, the selected areas 31 are, of course, undrawn, while ribs 51 between longitudinally aligned areas 31 and ribs 53 between transversely aligned areas 31 have been uniaxially stretched and thus oriented in the directions as indicated by double-headed arrows in the respective ribs. The remaining regions 55 of the web 29 have been subjected to both longitudinal and transverse stretching forces, as indicated by crossing arrows, and thus the molecules thereof have been biaxially oriented.

The uniaxially oriented webs 51 and 53 impart stiffness into the web 29 in the respective directions of such ribs and, together with the biaxially oriented regions 55, improve the web tensile strength properties. The unoriented areas 31 are well isolated from each other by the surrounding oriented ribs 51 and 53 and serve well in arresting any tearing which may initiate at other regions of the web.

While the size, shape and/or configuration of these selected unoriented areas 31 formed in the unoriented web 29 may be varied to provide in the resulting stretched product desired stiffness and/or strength characteristics, such areas 31 must be of substantially like size, aligned longitudinally and transversely of the web, and equally spaced in their respective longitudinal and transverse directions.

In another mode of practicing the above-described method, the chill roller 19 of the apparatus shown in FIG. 1 is substituted by a chill roller 57 having depressions 59 formed in its peripheral surface. The depressions in roller 59 are of substantially like circular and concave configuration, are aligned longitudinally and circumferentially of the roller surface and are equally spaced along their respective longitudinal and circumferential directions.

The apparatus shown in FIG. 1, modified as described above, is particularly adapted for use with thermoplastic materials which have a tendency to crystallize, as for example polyethylene terephthalate. In the operation of this modified apparatus, the stream 17 of molten thermoplastic polymeric material issuing from the nozzle 15 is received upon the chill roller 57 where it spans the depressions 59 while making snug contact with the remaining portions of the chill roller surface. While engaged and traveling with the chill roller 57 the stream 17 is quenched to provide an integral web 61.

During quenching, the areas of the stream 17 overlying the chill roller depressions 59 are, of course, cooled at a slower rate than the regions adjacent thereto which are in direct and snug contact with the surface of the roller 57. As a result, crystallization takes place in these slower cooling areas of the stream 17 during its quenching and, in the web 61, such areas have been identified at 63.

The rate of cooling and thus the degree of crystallinity which occurs in the selected areas 63 of the web 61, will depend upon such factors as the temperatures of the chill roller 57, the ambient atmosphere and extruded molten thermoplastic material and the size, depth and spacing of the chill roll indentations 57, and thus can be varied to provide for desired properties in the finished product. The web 61 is preferably completely cooled either on the chill roller 57 or directly after its removal therefrom.

The web 61 is removed from the chill roller 57 by the stripping roll 33 and is then subjected to longitudinal and transverse stretching forces in the same manner as the web 29, as heretofore described.

Figure 8:
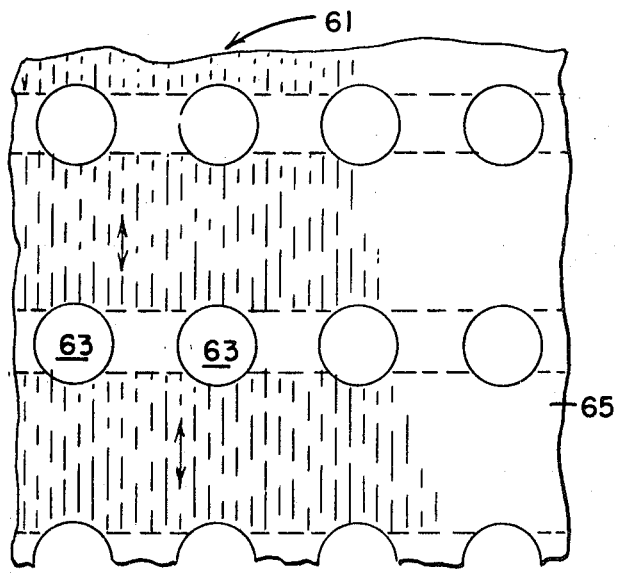
FIG. 8 is a plan view illustrating the web shown in FIG. 7 after it has been stretched along one of its axial directions.
Figure 9:
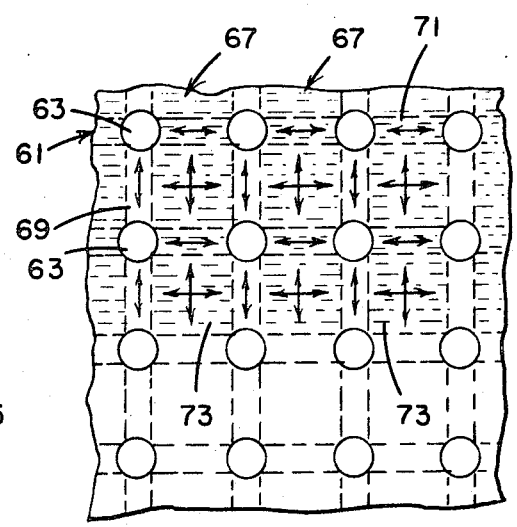
FIG. 9 is a plan view illustrating the web shown in FIG. 8, on a smaller scale, after it has been stretched along another of its biaxial directions.

During longitudinal stretching of the web 61, sections 65, which extend transversely thereof at longitudinally spaced intervals, are elongated as indicated in FIG. 8 to orient the molecules thereof. The crystallinity which has occurred in the areas 63 of the web prevent these areas, as well as the regions extending transversely between adjacent of such areas, from yielding under the longitudinal stretching forces. Transverse stretching of the now longitudinally drawn web 61 in the tenter frame 41 causes the sections 67, which extend longitudinally of the web at transversely spaced intervals thereof, to yield, as shown in FIG. 9, and thus orient the molecules thereof. As during the longitudinal stretching of the web 61 the areas 63 do not stretch and thus prevent drawing of the regions extending longitudinally between adjacent of such areas 63. The now stretched web 61 is passed between nip rolls 49 and collected by suitable means, not shown.

The product produced by this mode of practicing the method of the present invention is shown in FIG. 9 and includes ribs 69 and 71 between longitudinally and transversely aligned areas 63, respectively which are uniaxially oriented in directions as indicated by the double-headed arrows. The selected areas themselves are undrawn while the remaining regions 73 of the web 61 are biaxially oriented, as also indicated by arrows.

The stretched web 63 exhibits properties similar to those of the stretched web 29 heretofore described and thus both webs are adapted for like applications.

I claim:

1. A method of making a web of polymeric material having a predetermined pattern of molecularly oriented portions including the steps of extruding a flat, unbroken molten stream of orientable, thermoplastic polymeric material, partially cooling the extruded stream of molten thermoplastic material to provide an integral, substantially flat web, with selected, independent and substantially like areas aligned longitudinally and transversely of the extruded stream and equally spaced from each other in their respective directions being cooled at a more rapid rate than the regions adjacent thereto, and immediately after such cooling stretching the web along biaxial directions while the selected areas and the regions adjacent thereto are still heated at such different temperatures, the partial cooling of the extruded stream of molten thermoplastic material being only to such degree as to provide an integral web with only the regions adjacent to the selected areas being at such elevated temperatures as to yield and be molecularly oriented in response to the biaxial stretching forces which are applied to such web, whereby the regions of the web between adjacent transversely aligned selected areas are uniaxially oriented in a direction transversely of the web, the regions of the web between adjacent longitudinally aligned selected areas are uniaxially oriented in a direction longitudinally of the web, the selected areas themselves are substantially undrawn and the remaining regions of the web are biaxially oriented.

2. A method as defined in claim 1 wherein the web is stretched to produce fibrillation along the biaxially oriented regions thereof.

3. A method as defined in claim 1 wherein the web is stretched simultaneously along biaxial directions.

References Cited

UNITED STATES PATENTS

| | | | |
|---|---|---|---|
| 3,141,913 | 7/1964 | Edwards | 264—210 |
| 3,255,065 | 6/1966 | Wyckoff | 264—289 |
| 3,386,876 | 6/1968 | Wyckoff | 264—289 |
| 3,423,274 | 1/1969 | Lahm et al. | 264—348 |
| 3,505,157 | 4/1970 | Fields et al. | 264—210 |

ROBERT F. WHITE, Primary Examiner

J. R. THURLOW, Assistant Examiner

U.S. Cl. X.R.

264—154, 210, 237, 289, 348, DIG. 47

PO-1050
(5/69)

UNITED STATES PATENT OFFICE
CERTIFICATE OF CORRECTION

Patent No. 3,632,716                  Dated    January 4, 1972

Inventor(s)     Theodore H. Fairbanks

It is certified that error appears in the above-identified patent and that said Letters Patent are hereby corrected as shown below:

Col. 2, line 1, "rolls" should read -- webs --. Col. 3, line 9, "position" should read -- positioned --.

Signed and sealed this 30th day of May 1972.

(SEAL)
Attest:

EDWARD M. FLETCHER, JR.          ROBERT GOTTSCHALK
Attesting Officer                     Commissioner of Patents